(12) United States Patent
Kline et al.

(10) Patent No.: US 10,333,913 B2
(45) Date of Patent: Jun. 25, 2019

(54) DYNAMIC OBJECT PASSWORDS

(71) Applicant: International Business Machines Corporation, Armonk, NY (US)

(72) Inventors: Eric V. Kline, Rochester, MN (US); Mark E. Maresh, Wake Forest, NC (US); Colm Nolan, Meath (IE); Juan F. Vargas, Cary, NC (US); Cheranellore Vasudevan, Bastrop, TX (US); Michael J. Whitney, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

(21) Appl. No.: 15/595,583

(22) Filed: May 15, 2017

(65) Prior Publication Data
US 2018/0332013 A1 Nov. 15, 2018

(51) Int. Cl.
*H04L 29/06* (2006.01)

(52) U.S. Cl.
CPC ............ *H04L 63/06* (2013.01); *H04L 63/083* (2013.01)

(58) Field of Classification Search
CPC .............................. H04L 63/06; H04L 63/083
USPC ................................. 726/2–7; 713/150–155
See application file for complete search history.

(56) References Cited

U.S. PATENT DOCUMENTS

| | | | |
|---|---|---|---|
| 7,054,470 B2 | 5/2006 | Bolle et al. | |
| 7,593,000 B1 | 9/2009 | Chin | |
| 7,599,525 B2 * | 10/2009 | Lin | G06K 9/00597 382/117 |
| 8,117,458 B2 * | 2/2012 | Osborn, III | G06F 21/36 713/183 |
| 8,347,103 B2 | 1/2013 | Jones et al. | |
| 8,635,676 B2 | 1/2014 | Griffin et al. | |
| 8,638,939 B1 | 1/2014 | Casey et al. | |
| 8,997,215 B2 * | 3/2015 | Guriappa Srinivas | G06F 21/36 380/28 |
| 9,367,235 B2 | 6/2016 | Westerman et al. | |
| 9,444,626 B2 * | 9/2016 | Kim | G06F 3/017 |
| 2006/0206717 A1 | 9/2006 | Holt et al. | |

(Continued)

OTHER PUBLICATIONS

Alsulaiman et al., "A novel 3D graphical password schema." Virtual Environments, Human-Computer Interfaces Measurement Systems, Proceedings of 2006 IEEE International Conference on. IEEE, 2006.

(Continued)

*Primary Examiner* — Lynn D Feild
*Assistant Examiner* — Viral S Lakhia
(74) *Attorney, Agent, or Firm* — Garg Law Firm, PLLC; Rakesh Garg; Tihon Poltavets

(57) ABSTRACT

A construction of a dynamic object password (DOP) is initiated by selecting an object from a set of objects in a step of the construction. A transformation is applied to the object to form a transformed object by altering a dynamic aspect of the object. A placement operation is performed on the transformed object relative to a field position of the DOP. As a part of the step, a triple is generated including an identifier of the selected object, an identifier of the transformation, and an identifier of the placement operation. The triple is transmitted as a part of transmitting an authorization code, the authorization code forming the DOP.

20 Claims, 10 Drawing Sheets

(56) References Cited

U.S. PATENT DOCUMENTS

| | | |
|---|---|---|
| 2007/0041621 A1 | 2/2007 | Lin et al. |
| 2012/0192268 A1 | 7/2012 | Wang |
| 2012/0304284 A1 | 11/2012 | Johnson et al. |
| 2013/0212387 A1* | 8/2013 | Oberheide .............. H04L 63/08 713/168 |
| 2016/0087969 A1* | 3/2016 | Liu ................... H04L 29/12207 726/6 |
| 2016/0359839 A1* | 12/2016 | Natividad ............. H04L 63/083 |
| 2017/0034144 A1* | 2/2017 | Kisters ................. G06Q 20/385 |
| 2017/0295149 A1* | 10/2017 | Lu ........................... G06F 21/45 |
| 2017/0308695 A1* | 10/2017 | Adams ................... G06F 21/46 |
| 2017/0339514 A1* | 11/2017 | Kwon ................... H04W 76/14 |
| 2018/0069843 A1* | 3/2018 | Alarifi ................... H04L 63/083 |

OTHER PUBLICATIONS

Jermyn et al. "The design and analysis of graphical passwords." Usenix Security. 1999.
Insurance Information Institute, Inc; Identity Theft and Cybercrime, 2017.

* cited by examiner

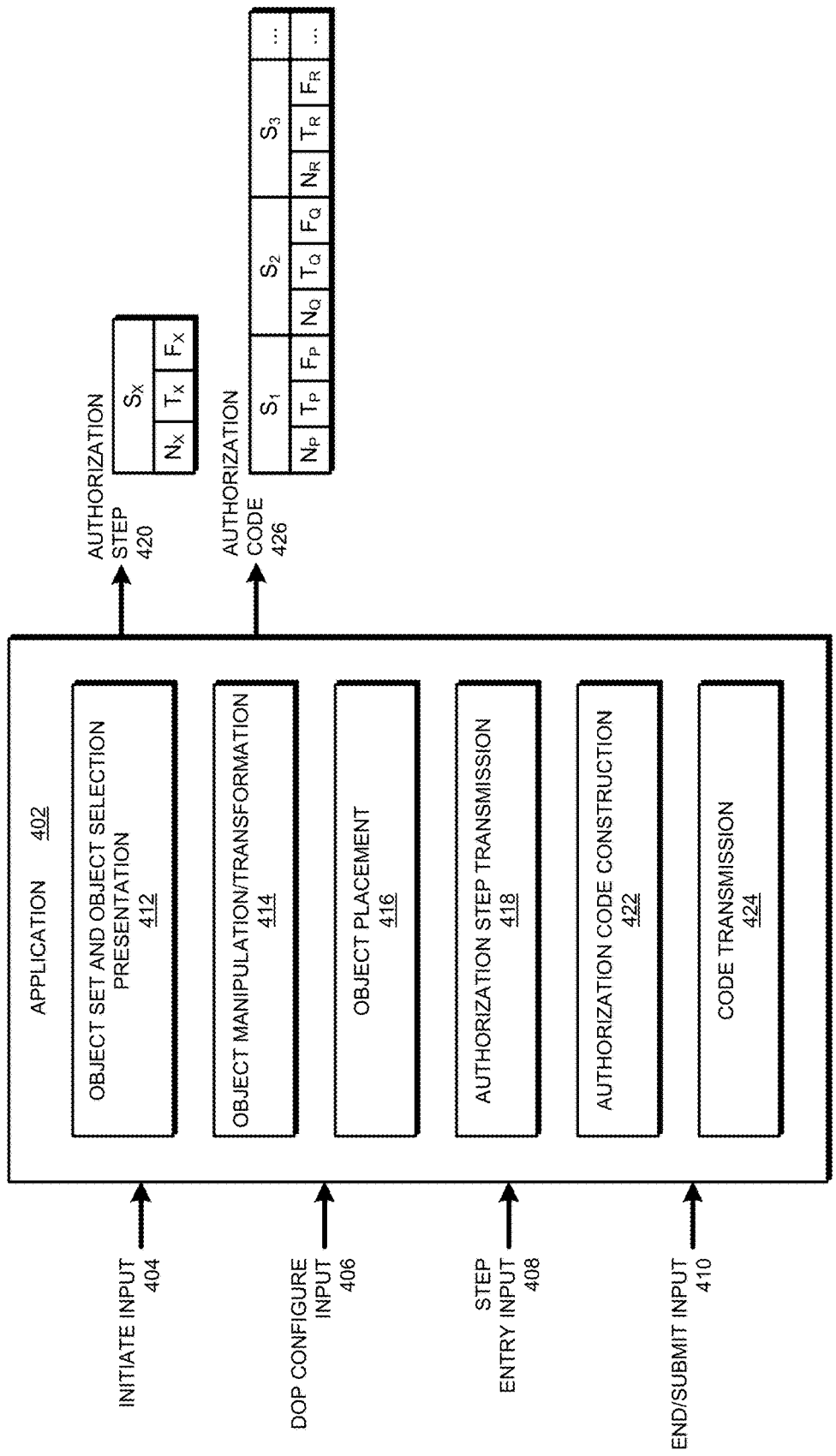

DYNAMIC OBJECT PASSWORDS

TECHNICAL FIELD

The present invention relates generally to a method, system, and computer program product for creating and using strong passwords. More particularly, the present invention relates to a method, system, and computer program product for creating and using dynamic object passwords.

BACKGROUND

A "password" is a method of authenticating a user or system to a server or service. Generally, a password includes a string of characters that is difficult to understand, guess, or reproduce. The harder the string is to understand, guess, or reproduce, the stronger is the password.

Some other types of passwords allow a user to draw a pattern with a finger or a stylus. The drawn pattern itself operates as a password and is compared with a pre-stored pattern. A match within a tolerance allows the user or system to be authenticated, a mismatch rejects the password.

Some other types of passwords allow a user to connect the dots in a dot matrix using a finger or a stylus. The pattern in which the dots are connected operates as a password and is compared with a pre-stored pattern. A match within a tolerance allows the user or system to be authenticated, a mismatch rejects the password.

Biometrics are also commonly used as passwords. For example, a pattern of lines and points in a user's fingerprint is stored as the user's password. More than one such fingerprint patterns may be stored for a user. When the user presents the fingerprint, the pattern in the presented fingerprint is matched within a tolerance with the stored pattern or patterns to authenticate the user.

Hereinafter, a "user" can be a human user or a system, who/which can present a password for authentication. Hereinafter, a "server" is any machine or service that can accept a password from the user and authenticate the user.

SUMMARY

The illustrative embodiments provide a method, system, and computer program product. An embodiment includes a method that initiates a construction of a dynamic object password (DOP) by selecting an object from a set of objects in a step of the construction. The embodiment applies a transformation to the object, to form a transformed object, by altering a dynamic aspect of the object. The embodiment performs a placement operation on the transformed object relative to a field position of the DOP. The embodiment generates, as a part of the step, a triple comprising an identifier of the selected object, an identifier of the transformation, and an identifier of the placement operation. The embodiment transmits the triple as a part of transmitting an authorization code, the authorization code forming the DOP.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 4 depicts a block diagram of an example application for creating or using dynamic object passwords in accordance with an illustrative embodiment;

DETAILED DESCRIPTION

Figure 1:
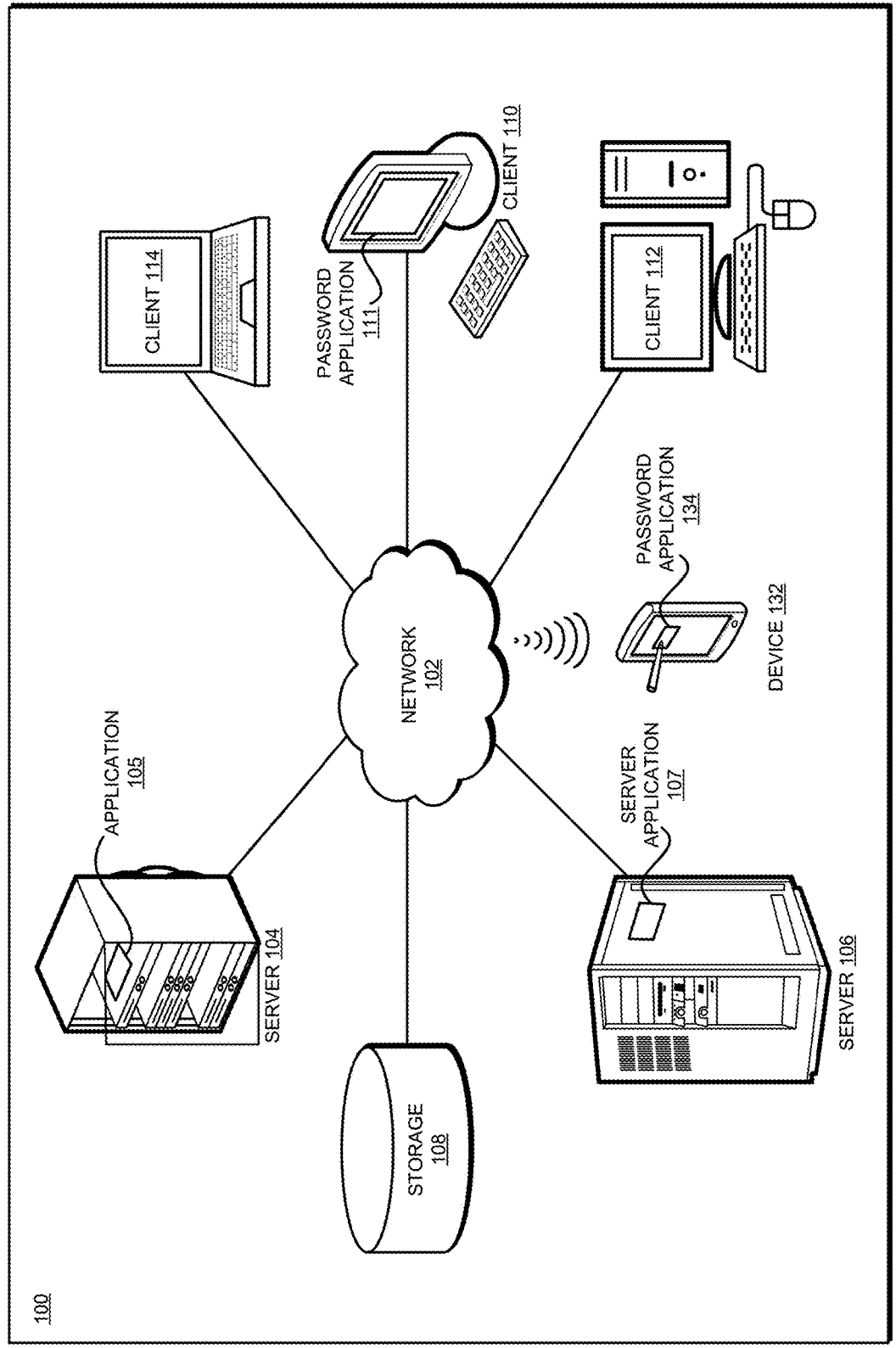
FIG. 1 depicts a block diagram of a network of data processing systems in which illustrative embodiments may be implemented.

The illustrative embodiments recognize that most presently used passwords are static in nature. In other words, most presently used passwords are constructed using text or patterns that have no movements or transformations applied to the text or patterns. Essentially, a presently used password is a string of characters or a drawing without any motion, movement, change, or transformation being a part of the password.

The illustrative embodiments recognize that to create a strong password, presently either the length of the password has to be increased, the set of characters from which the password is created has to be enlarged, the pattern has to be increased in complexity, or some combination thereof has to be applied. Regardless of how strong passwords are presently created, generally, a password has to be sufficiently long—e.g., 8-16 characters, at least a four-point pattern, and so on—for the password to be regarded as strong. Using the presently available techniques for creating passwords, compact passwords—e.g., a password as short as one or two characters—are regarded as weak passwords. The illustrative embodiments recognize that strong passwords of compact lengths can be produced by introducing in the password an element of transformation.

The illustrative embodiments recognize that the presently available tools or solutions do not address these needs/ problems or provide adequate solutions for these needs/ problems. The illustrative embodiments used to describe the invention generally address and solve the above-described problems and other related problems by crating and using dynamic object passwords.

An embodiment can be implemented as a software application. The application implementing an embodiment, or one or more components thereof, can be configured as a modification of an existing authentication system—i.e., a native application in the authentication system, as an application executing in a data processing system communicating with an existing authentication system over a local area network (LAN)—i.e., a local application on the LAN, as an application executing in a data processing system communicating with an existing authentication system over a wide area network (WAN)—i.e., a remote application on the WAN, as a separate application that operates in conjunction with an existing authentication system in other ways, a standalone application, or some combination thereof.

Hereinafter, a single character or dot position of a prior-art password is interchangeably referred to herein as a field position, placement location, or simply a location. For example, if a prior-art password is "adohl8urqn" the character "a" is in field position 1, character "d" is in field position 2, character "8" is in position 6, and so on.

An embodiment allows a selection of an object for a field position. An object can be any character representable in unicode, symbol, font, static image, animated image, video clip, sound generating data, an audio clip, or vibration or tactile feedback causing data. A set of objects available to the embodiment for such a selection can include a mix of any number and types of objects.

A user provides an input to select an object from the set of objects. The user provides an input to apply a transformation to the object. An embodiment applies the requested transformation to the selected object. A transformation includes but is not limited to changing a shape or size of the object, changing an orientation or position of the object relative to a reference, changing a color or other characteristic of the object, changing a weight or intensity of the object, changing or causing a movement of/in the object, or generally making a change in an appearance or behavior of the object. The transformation is encoded into the password, as will be described with respect to several embodiments hereinbelow.

Some non-limiting examples of the transformations include—changing a color (e.g., making a color image object of a ball to grayscale), changing a font (e.g., of a letter object), turning an image along the X/Y/Z axis, adding a motion (e.g., causing an image of a ball to bounce), adding/muting a sound (e.g., adding a bounding sound to the bouncing ball image, or muting a sound clip object), slowing/speeding a playback (e.g., slowing down a video clip object, or speeding up an audio clip object), changing a perspective (e.g., turning a picture for a sideways glancing view), changing a size (e.g., making a beach ball image smaller than an original image of the ball), changing a relative size (.g., making an image of a beach ball appear smaller than an image of a marble), moving an image from one location to another (move/drag-and-drop an image of a beach ball from a selection area to a field, or from one field to another field, or delete the image from a field position, etc.

These examples of transformations are not intended to be limiting. From this disclosure, those of ordinary skill in the art will be able to conceive many other transformations and their applications to these and other types of objects, and the same are contemplated within the scope of the illustrative embodiments.

The user provides an input to place the transformed object in a selected field position. Note that in some embodiments, the placement of an object into a field itself can be encoded as a transformation of the object, resulting in a transformed object. An embodiment places the transformed object in the selected position in the password.

In this manner, a password is either created for the first time, or used after creation, by selecting objects, transforming the objects, and positioning the transformed objects into various field positions. In a password created in this manner, each field position has three characteristics—the object or an identifier of the object, the transformation or an identifier of the transformation that is applied to the object, and the field position. As an example, a particular object is denoted herein by identifier Nx; a particular transformation is denoted by Tx, and a particular field position is denoted by Fx.

Thus, a particular step in the creation or use of a password according to the illustrative embodiments comprises a triple: Sx=[Nx, Tx, Fx], also represented as NxTxFx, where each component of the triple can repeat one or more number of times in the triple. An example of step x could be 07a1301, where (one) object 07a receives (one) transformation 13 and gets positioned (once) in position 01.

According to an embodiment, multiple steps can be applied to the same field position or different field positions, to any number of field positions. A password formed by the illustrative embodiments in this manner is referred to as a dynamic object password (DOP).

For example, S1=[Nx, Tx, F1], i.e., step 1 applies transformation Tx to object Nx and places the transformed object in field position 1; and S2=[Ny, Ty, F1], i.e., step 2 applies transformation Ty to object Ny and places the transformed object in field position 1 thereby overwriting transformed object Nx from step 1 in field position 1. Even though only one object—transformed Ny remains in field position 1, the password actually comprises two steps S1 and S2.

Thus, even if the DOP was one field position in length, e.g., one character-length according to the prior-art passwords, the DOP would appear as 07a130109c0201 to a server (where S1=object 07a receives transformation 13 and occupies position 01, followed by object 09c receiving transformation 02 and occupying field position 01). A prior-art password would simply appear as a single character, e.g., "x", or a single dot in a pattern.

Any number of such steps could modify the same of different fields in a DOP of the illustrative embodiments. As can be seen a DOP of a single field position can thus be made infinitely complex by applying any number of object transformations to the same field position. The same is true of a DOP having more than one field positions.

The overwriting of an existing object in a field position is only one example manner of populating a field position. Only for the clarity of the description, and not to imply any limitation on the illustrative embodiments, the embodiments are described with respect to one object in one field position. In the above example, S2 need not overwrite the object placed by S1. An embodiment can be adapted to position multiple objects in a field and permit selective transformation of one or more of such multiple objects. Such adaptations are contemplated within the scope of the illustrative embodiments.

One embodiment collects all step triples until the user indicates that the password is complete and should be sent to the server for authentication. For example, a password app on a device collects steps in an example form of "O1T1F1O2T2F2O3T3F1O4T1F99 . . . " until the device receives a "send" or "submit" input. Upon such send or submit input, the device transmits the entire set of steps—referred to herein as an authentication code or auth-code—e.g., "O1T1F1O2T2F2O3T3F1O4T1F99 . . . " string, to a server application.

Another embodiment transmits subsets of a set of steps to the server, as the steps are collected. For example, the user manipulates an object to cause an embodiment to generate S1="O1T1F1". The embodiment sends a step-referred to herein as an authentication step or auth-step—e.g., "O1T1F1", to the server causing the server to collect the steps of a DOP. Similarly, the embodiment sends auth-step "O2T2F2" separately, auth-step "O3T3F1" later, and so on. The server assembles the steps received during the construction of the password to build "O1T1F1O2T2F2O3T3F1O4T1F99 . . . " when the embodiment sends a "send" or "submit" indication to the server. In a similar manner, an embodiment can transmit single auth-steps at a time, a subset of auth-steps at a time, or the entire set of steps—i.e. an auth-code—of a DOP at one time to the server.

The manner of creating and using dynamic object passwords described herein is unavailable in the presently available methods. A method of an embodiment described herein, when implemented to execute on a device or data processing system, comprises substantial advancement of the functionality of that device or data processing system in creating and using compact yet strong passwords that include a dynamic aspect in the field positions of the password.

The illustrative embodiments are described with respect to certain types of passwords, password lengths, objects, transformations, field positions, steps, triples, auth-steps, auth-codes, manners of authentication, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
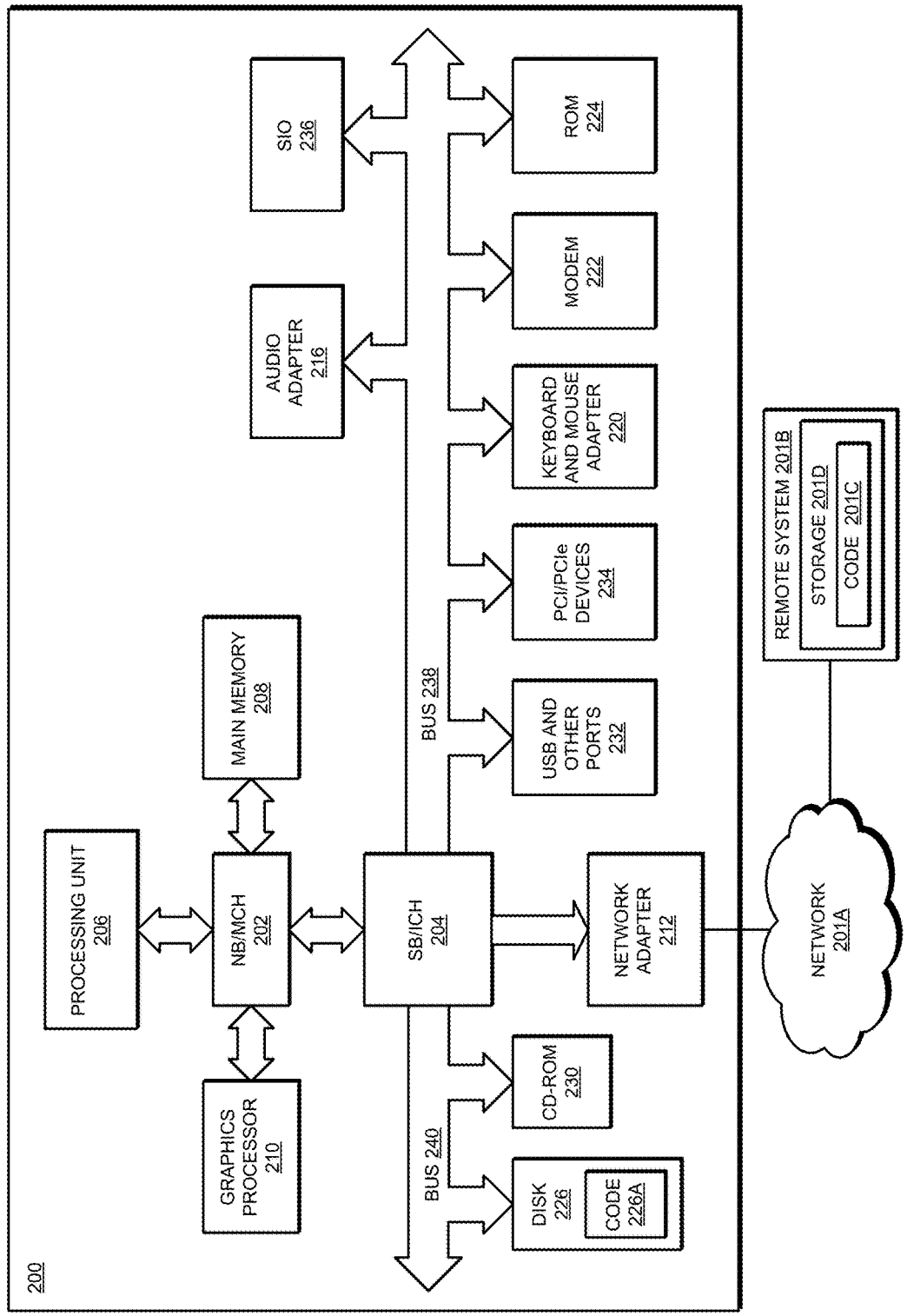
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 implements a remotely usable function (remote) of an embodiment described herein. As an example, application 111 implements a locally usable function (local) or a natively usable function (native) of an embodiment described herein. As an example, application 134 implements a natively usable function (native) of an embodiment described herein. Applications 105 and 111 can be used in a combination, applications 105 and 134 can be used in another combination, and applications 105, 111, and 134 can be used in another combination, to distribute certain functions of an embodiment. For example, any of applications 105, 111, or 134 can be configured to supply a set of objects to a user, receive a user input, construct an auth-step or an auth-code of a DOP, or some combination these functions, in a manner described herein. Any of applications 105, 111, or 134 can be further configured to submit the DOP to a server for authentication, such as to server application 107. Server application 107 is configured to recognize and use DOPs for user authentication.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105, 111, or 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
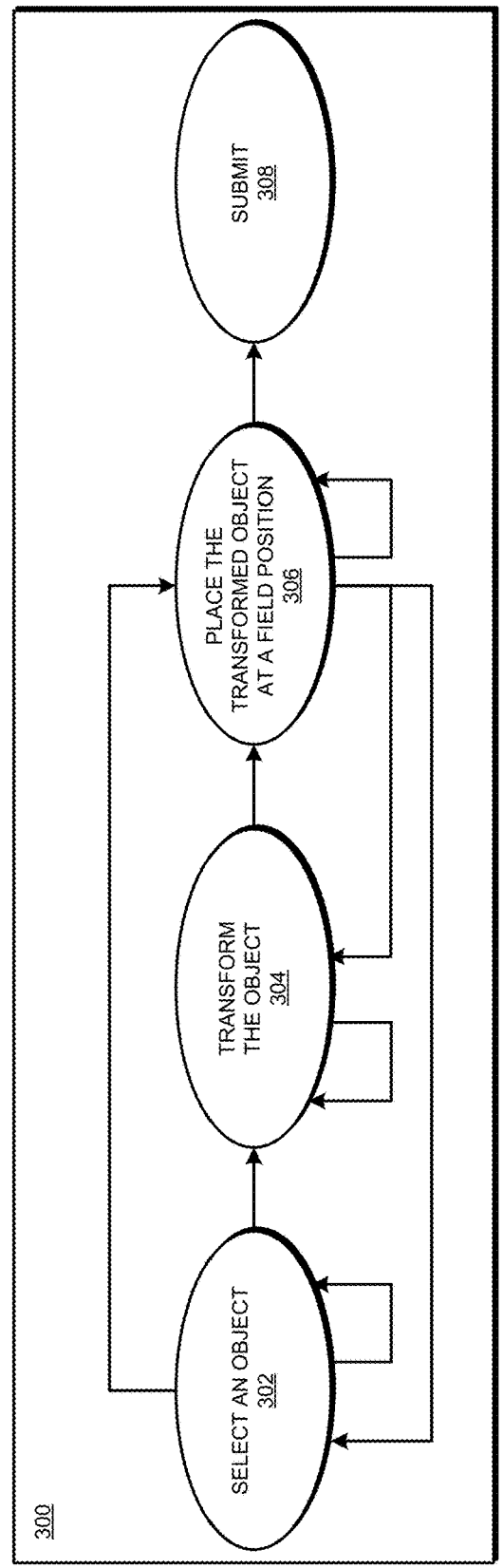
FIG. 3 depicts a state-transition diagram of an example operation for creating or using dynamic object passwords in accordance with an illustrative embodiment.

With reference to FIG. 3, this figure depicts a state-transition diagram of an example operation for creating or using dynamic object passwords in accordance with an illustrative embodiment. Any of applications 105, 111, or 134 can implement state-transitions 300.

An application implementing an embodiment or a portion thereof reaches state 302 when a user indicates using a suitable input that a DOP is to be entered. In state 302, the application receives an input to select an object from a set of objects.

State 302 can repeat any number of times. For example, the user can select Oa, then Ob, and so on until Ox, and then apply a transformation to Ox. Such a step would cause auth-step OaObOc . . . OxTxFx or "Oa<blank><blank>Ob<blank><blank>Oc<blank> <blank> . . . OxTxFx" to be generated. This example auth-step can also be represented as [Oa, ,] [Ob, ,] [Oc, ,] . . . [Ox,Tx,Fx].

The application transitions to state 304. It is possible to place an object into a field position without transformation (auth-step Ox<blank>Fx or Ox00Fx, where a blank transformation or a predesignated transformation code, e.g., 00, indicates no transformation). In such cases, the application proceeds to state 306. Again, recall that a drag-and-drop of an object into a position, movement of an object from one position to another, deletion or removal of an object from a position can also be encoded as transformations within the scope of the illustrative embodiments, as described herein.

In state 304, the application receives an input to perform a transformation on the object selected in state 302. Any number of transformations can be applied in a series starting from the selected object to the progressively transforming object resulting from previous transformations in the series. For example, a step can be OxTaTbTc . . . TnFy or "OxTa<blank>OxTb<blank>OxTc<blank> . . . OxTnFy". This step can be represented as [Ox, Ta,] [Ox, Tb,] [Ox, Tc,] . . . [Ox,Tn,Fy]. When no more transformations are to be applied to the object, the application enters state 306.

In state 306, the application receives an input to place the transformed object in a particular field position. The placement of state 306 can be repeated any number of times. For example, a transformed object can be placed in one position for one step, and moved to another position for another step that also generates a valid auth-step, and so on. For example, a step can be OxTxFaFbFc . . . Fy or "OxTxFa<blank><blank>Fb<blank><blank>Fc . . . <blank><blank>Fy". This step can be represented as [Ox, Tx,Fa][ . . . Fb][, ,Fc] . . . [, ,Fy]. The application can also return to state 304 to transform a transformed object already placed in a position, apply another transformation to that object, and place the object in a different position as a valid auth-step. The application can also return to state 302 to select another object and proceed through state transitions 300 in any of the manner described herein.

Furthermore, the position need not be selected for the transformed object in any particular order. For example, the first transformed object can be placed in the fifth position and the second transformed object in the second position, and so on. There is no limit imposed by the illustrative embodiments on the number of field positions that must be occupied by objects either. For example, one can result with a valid auth-code comprising several steps where the steps are constructed in such a manner that the last transformation deletes the object and placed a null object in a position, a placement moves an object out of a field position leaving the position void, or both.

Such auth-codes can result in some or all password field positions being empty/blank/void/null. Note that an empty string is indicative of "no password" and is not regarded as a password in the prior-art, whereas a seemingly empty password according to the illustrative embodiments can in fact cause a nonempty auth-code—a valid DOP—to be generated.

With reference to FIG. 4, this figure depicts a block diagram of an example application for creating or using dynamic object passwords in accordance with an illustrative embodiment. Application 402 can be implemented as application 105, 111, 134, or some combination thereof. Application 402 can be adapted to implement all or a part of state transitions 300 in FIG. 3.

Application 402 receives input 404, which indicates that a DOP entry is to be initiated. This input may be simply the placement of a cursor in a password field.

Input 406 initiates the DOP configuration in application 402. For example, input 406 may select an object from a set of object at state 302 in FIG. 3.

Input 408 indicates that a step for generating an auth-step has been completed. Input 410 indicates that the entire DOP has been entered and the auth-code is complete for use in an authentication.

Component 412 presents a set of objects for selection. Input 406 selects an object. Component 414 uses input 406 to transform the selected object. Component 416 uses input 406 to place the transformed (or non-transformed) object into a field position.

When application 402 is configured to do so, component 418 causes a single auth-step or a subset of auth-steps to be transmitted for server-side collection. Auth-step 420 is a non-limiting example of a single step transmission.

When application 402 is configured to do so, component 422 collects the steps and constructs an auth-code. Component 424 transmits the full auth-code. Auth-code 426 is a non-limiting example of an auth-code transmission.

Figure 5A:
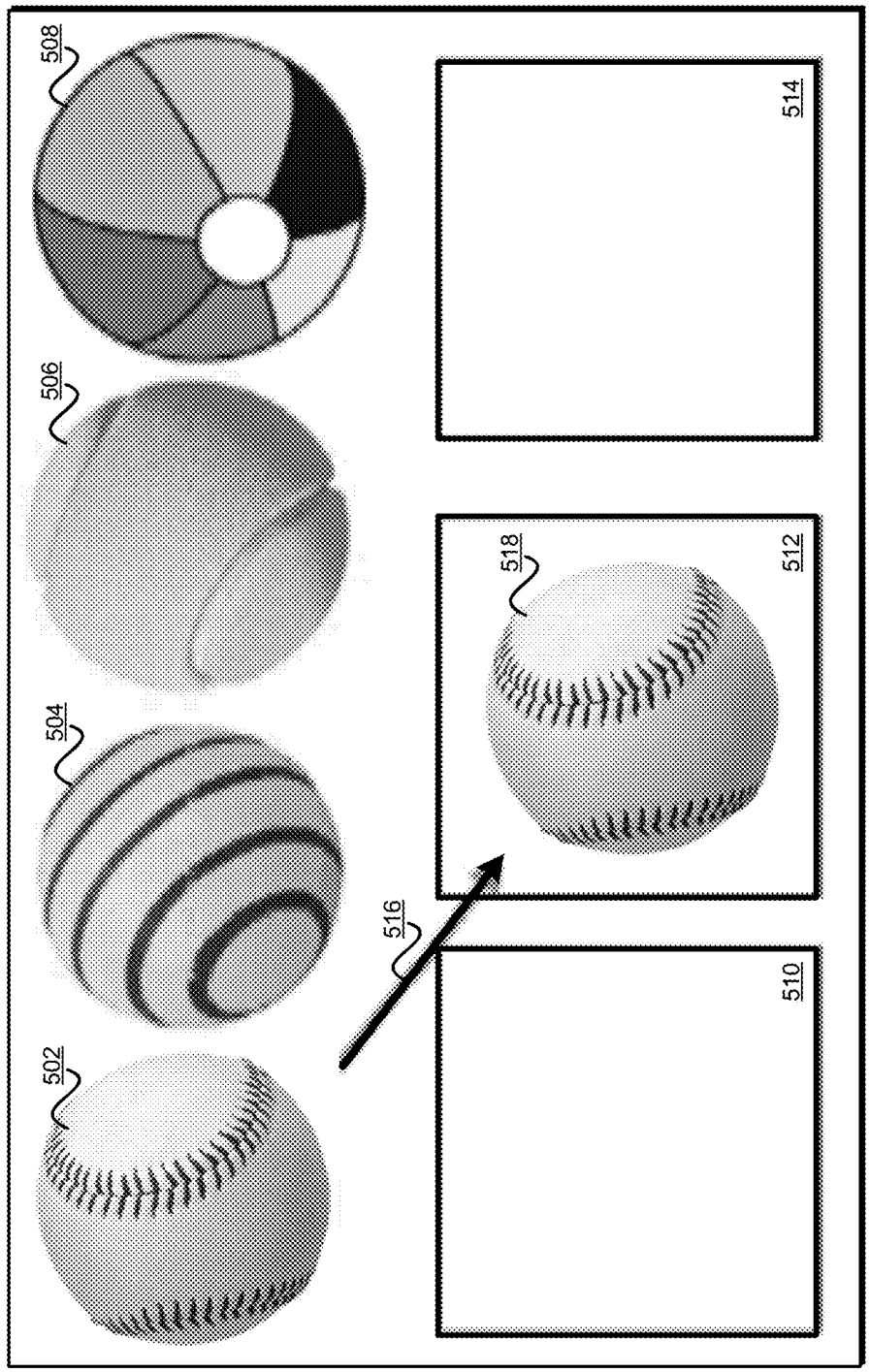
FIG. 5A depicts an example step in the construction of a DOP in accordance with an illustrative embodiment.

With reference to FIG. 5A, this figure depicts an example step in the construction of a DOP in accordance with an illustrative embodiment. Application 402 performs an operation described with respect to this figure.

Suppose, as a non-limiting example, that a set of objects comprises objects 502, 504, 506, and 508. Further assume that a DOP of three field positions 510, 512, and 514 is to be constructed. The user provides a selection and a placement input which causes the application to select object 502 from the set and perform placement 516 of object 502 in position 512. This may be an example of step 1, which produces example [O1, , 02] triple, or "O1 02" auth-step. Object 506 placed in position 512 becomes object 518. No transformation is applied only as a simplification of the example. Even though such is not the case in this simplified example, an embodiment can be adapted as described herein to encode as a transformation the initial placement of the object into a position, moving of an object from one position to another position, or deletion of an object from a position.

Figure 5B:
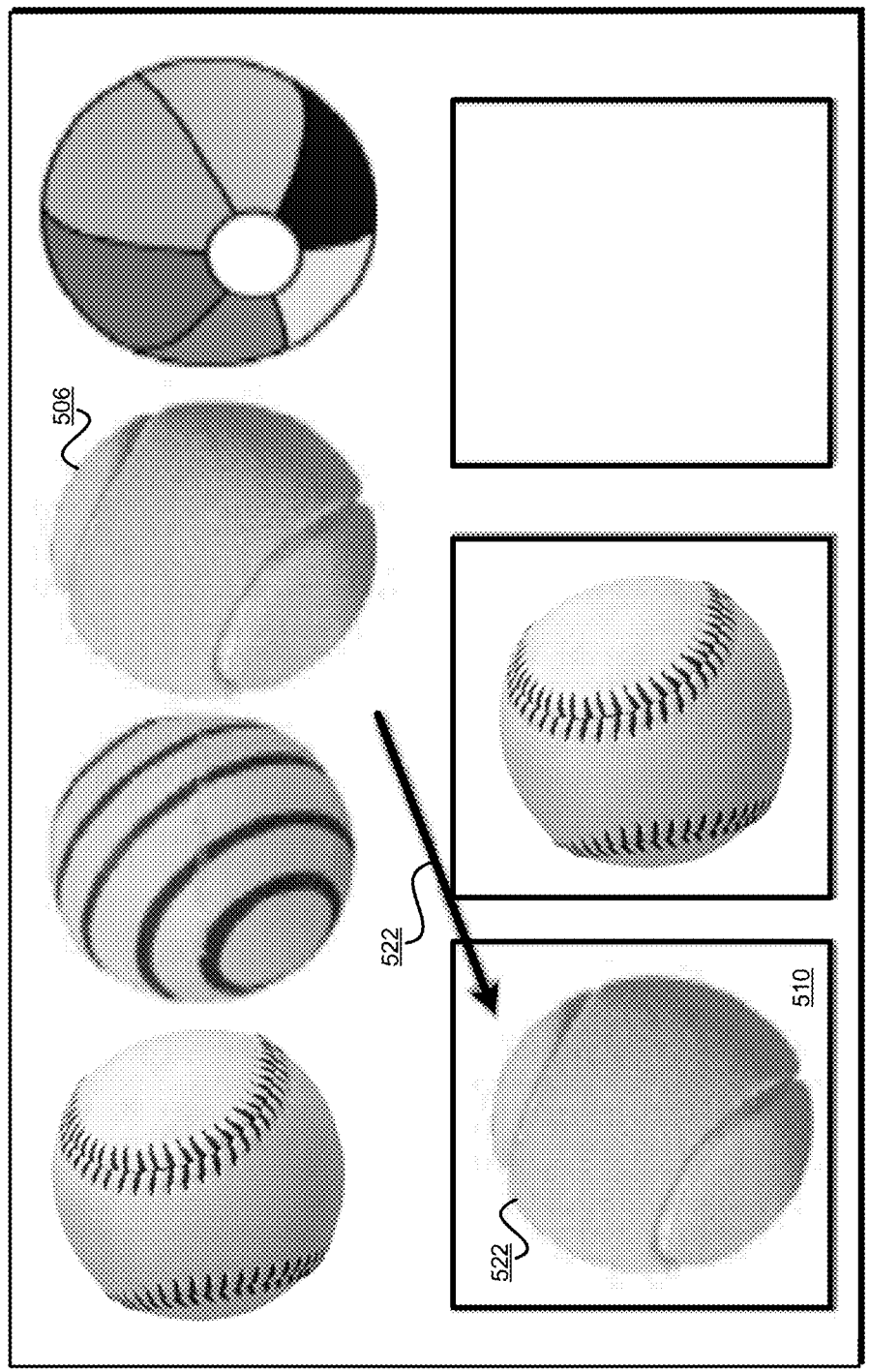
FIG. 5B depicts another example step in the construction of a DOP in accordance with an illustrative embodiment.

With reference to FIG. 5B, this figure depicts another example step in the construction of a DOP in accordance with an illustrative embodiment. Application 402 performs an operation described with respect to this figure.

Continuing from the example depicted in FIG. 5A, next, the user provides a selection and a placement input which causes the application to select object 506 from the set and perform placement 520 of object 506 in position 510. This may be an example of step 2, which produces example [O3 , , 01] triple, or "O3 01" auth-step. Object 506 placed in position 510 becomes object 522. No transformation is applied only as a simplification of the example.

Figure 5C:
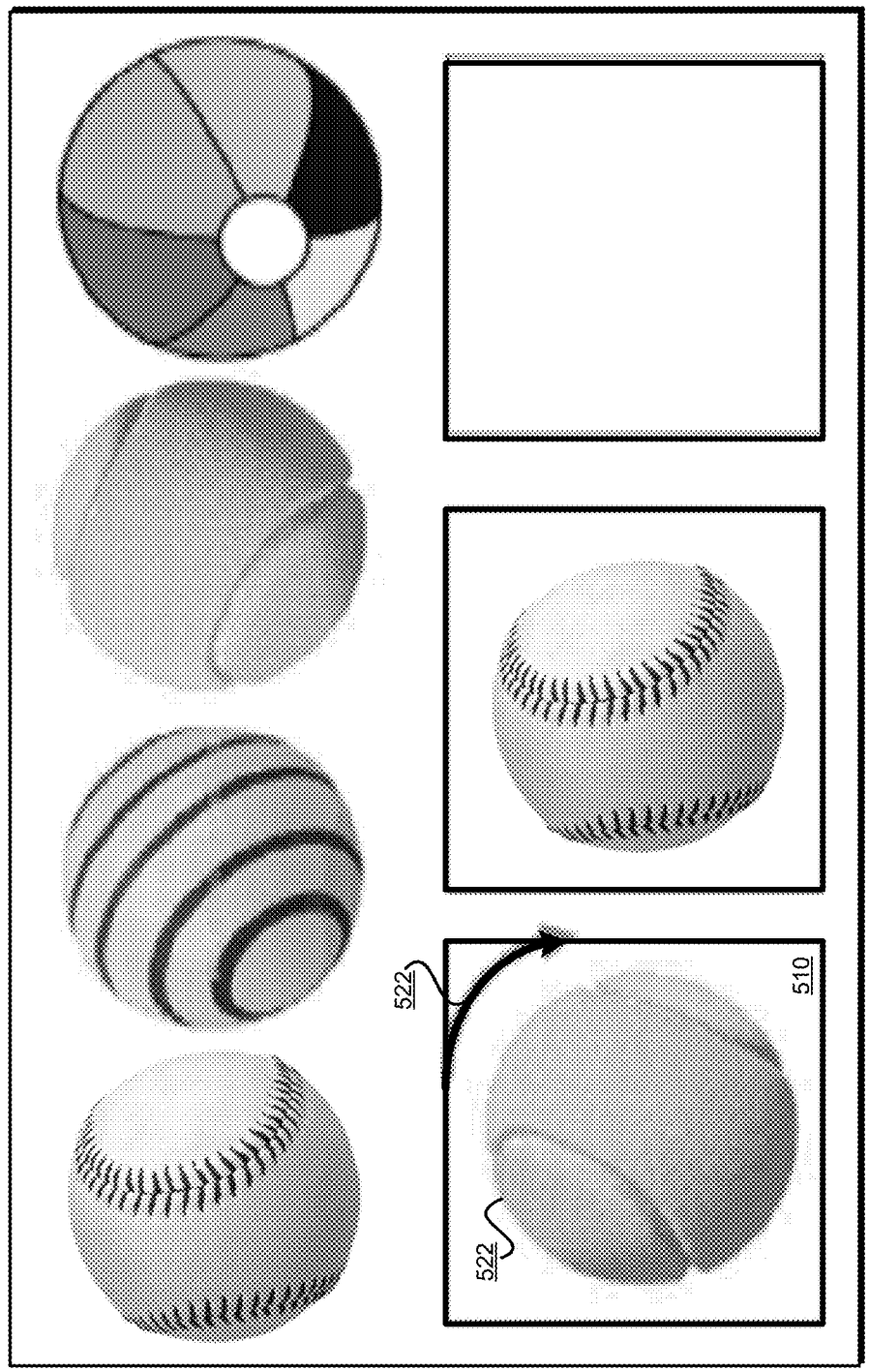
FIG. 5C depicts another example step in the construction of a DOP in accordance with an illustrative embodiment.

With reference to FIG. 5C, this figure depicts another example step in the construction of a DOP in accordance with an illustrative embodiment. Application 402 performs an operation described with respect to this figure.

Continuing from the example depicted in FIG. 5B, next, the user provides a selection, transformation, and placement input which causes the application to select object 522, transform object 522 by rotating object 522 clockwise by ninety degrees—forming object 524, and perform placement 526 of object 524 in position 510. This may be an example of step 3, which produces example [Ox,03,01] triple, or "Ox0301" auth-step.

Figure 5D:
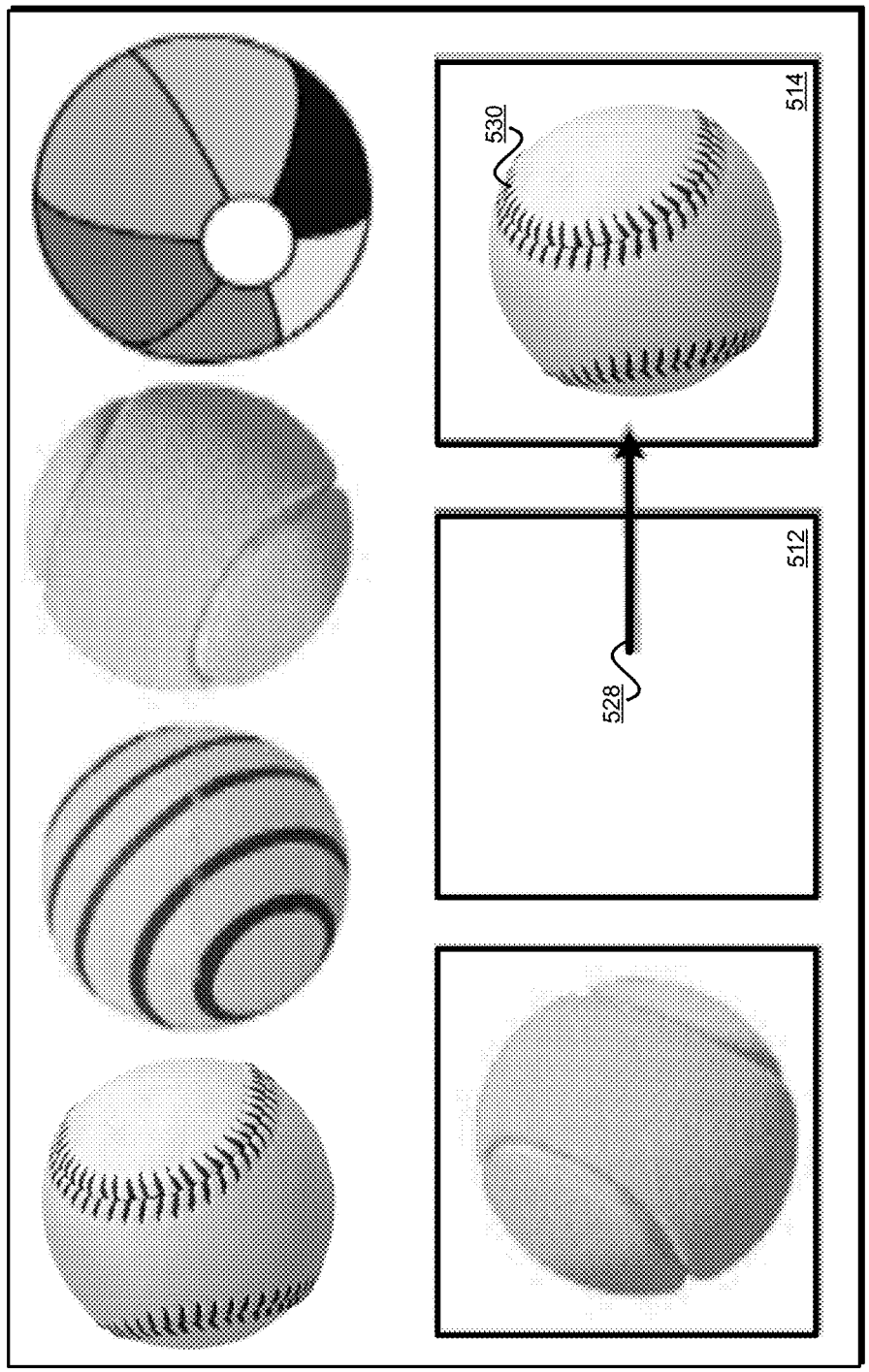
FIG. 5D depicts another example step in the construction of a DOP in accordance with an illustrative embodiment.

With reference to FIG. 5D, this figure depicts another example step in the construction of a DOP in accordance with an illustrative embodiment. Application 402 performs an operation described with respect to this figure.

Continuing from the example depicted in FIG. 5C, next, the user provides a selection and placement input which causes the application to select object 518 and perform placement 528 of object 518 which moves object 518 from position 512 to position 514, forming object 530 in position 514. This may be an example of step 4, which produces example [Oy, , 03] triple, or "Oy 03" auth-step, when the movement itself is not regarded as a transformation. As described herein, the movement can be encoded as a transformation as well. In such a case, example step 4 may produce [Oy,Tm,03] triple, or OyTm03 auth-step, wherein Tm represents a drag-drop or other movement-based transformation, as described herein.

Many other such steps are possible, using objects from the original set of objects or a transformed object in a field position. The steps may perform one or more transformations, placements, or both.

Figure 6:
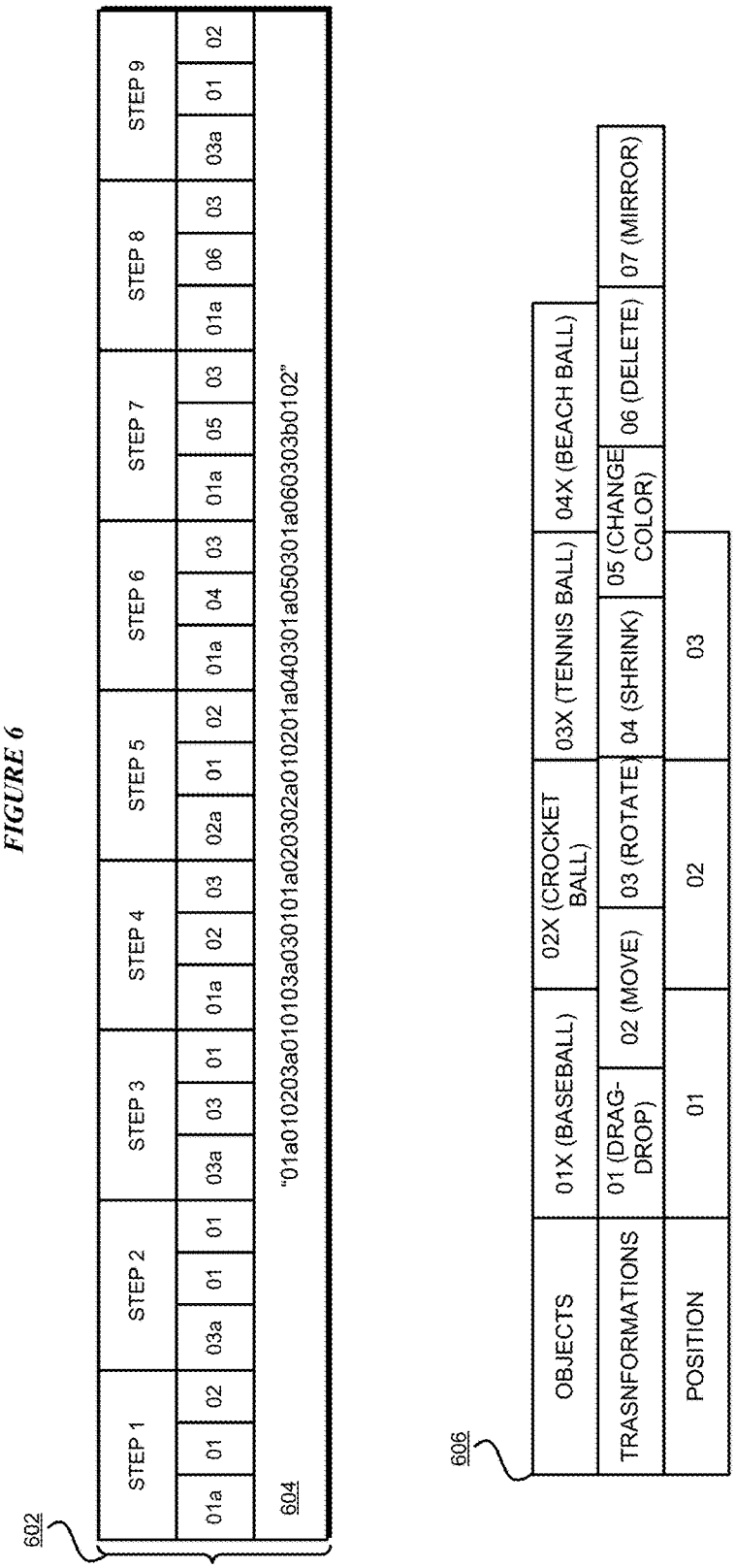
FIG. 6 depicts an example set of steps and a corresponding auth-code in accordance with an illustrative embodiment.

With reference to FIG. 6, this figure depicts an example set of steps and a corresponding auth-code in accordance with an illustrative embodiment. Steps 1-9 in block 602 each show one object code, one transformation code, and one position code only as an example. Code 604 corresponds to steps 1-9 in block 602 in a manner described herein.

The steps in block 602 are configured according to table 606. Table 606 describes the object codes, transformation codes, and field positions available for constructing code 604. For example, the objects in table 606 are identified by numbers 01 to n. The X in an object code represents a version of the object. For example, the first time the baseball object is dragged and dropped into a password field it is assigned "01a", where "a" is the suffix. The second time the baseball object is dragged and dropped into a password field it is assigned "01b", where "b" is the second instance of the baseball object, and so on. Depending on the particular implementation, the suffix of an object can be changed, or need not change, when the object is moved between field positions. In the depicted example, according to an example implementation, if an object is deleted in a password field, the suffix is not reused if the same object is later dragged and dropped into a field position.

Table 606 identifies the transformations by numbers 01 to m. In table 606, there are seven example transformation shown, but the example list of transformations is not all inclusive and is not intended to be limiting. Table 606 identifies the password field positions by numbers 01 to p. In table 606, there are three example password fields shown, but any number of field positions could be implemented depending on the security level desired.

Figure 7:
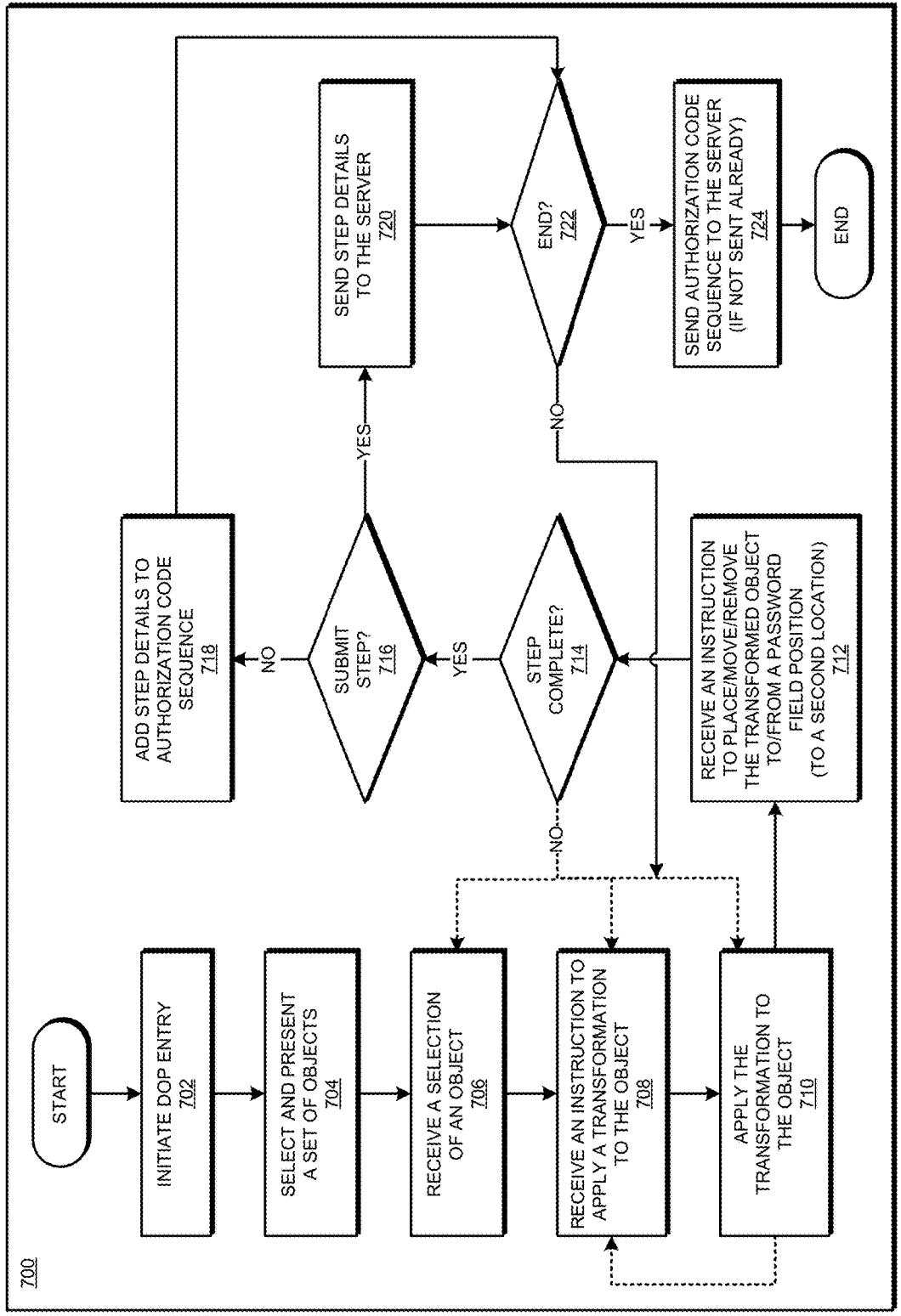
FIG. 7 depicts a flowchart of an example process for creating or using dynamic object passwords in accordance with an illustrative embodiment.

With reference to FIG. 7, this figure depicts a flowchart of an example process for creating or using dynamic object passwords in accordance with an illustrative embodiment. Process 700 can be implemented in application 402 in FIG. 4.

The application initiates a DOP entry (block 702). The application selects and presents a set of objects (block 704). The application receives a selection of objects (block 706).

The application receives an instruction to apply a transformation to the selected object (block 708). The application applies a transformation according to the instruction to the selected object (block 710). Blocks 708-710 may be skipped in some cases. Blocks 708-710 may be repeated any number of times. A transformed object is added to the set of objects so that the transformed object is available for further transformation steps as described herein.

The application receives an instruction to place/move/remove an object to/from a field position (block 712). The operation of block 712 can be performed in one or more steps as described herein.

The application determines whether a step is complete (block 714). If the step is not complete ("No" path of block 714), the application returns to block 706, or 708, or 710, depending on the user's instruction.

If the step is complete ("Yes" path of block 714), the application determines whether to send the step to the server (block 716). If the step is not to be sent to the server ("No" path of block 716), the application adds the step to an auth-code and proceeds to block 722. If the step is to be sent to the server ("Yes" path of block 716), the application sends the step to the server and proceeds to block 722.

The application determines whether the DOP entry has ended (block 722). If the DOP entry has not ended ("No" path of block 722), the application returns to block 706, or 708, or 710, depending on the user's instruction. If the DOP entry has ended ("Yes" path of block 722), the application sends the auth-code to the server if auth-steps have not been sent already (block 724). The application ends process 700 thereafter.

Thus, a computer implemented method, system or apparatus, and computer program product are provided in the illustrative embodiments for dynamic object passwords and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    initiating a construction of a dynamic object password (DOP) for user authentication by selecting an object from a set of objects in a step of the construction;
    applying a transformation to the object, to form a transformed object, by altering a dynamic aspect of the object;
    performing a placement operation on the transformed object relative to a field position of the DOP;
    generating, as a part of the step, a triple comprising an identifier of the selected object, an identifier of the transformation, and an identifier of the placement operation; and
    transmitting to a server application the triple as a part of transmitting an authorization code, the authorization code forming the DOP.

2. The method of claim 1, further comprising: adding the transformed object to the set of object such that the transformed object is available for the selecting in a subsequent step of the construction of the DOP.

3. The method of claim 1, wherein a visible manifestation of the DOP shows the transformed object in field position.

4. The method of claim 1, further comprising: sending only the triple as a part of the transmitting.

5. The method of claim 1, wherein transmitting the triple comprises transmitting several triples corresponding to several steps, and wherein the several steps are a subset of a set of steps such that the set of steps form the DOP.

6. The method of claim 1, wherein the field position and a number of the step are different from each other.

7. The method of claim 1, wherein the placement operation removes the transformed object from the field position, making the field position empty.

8. The method of claim 1, wherein a set of placement operations in the DOP cause each field position in the DOP to become empty.

9. The method of claim 1, wherein the dynamic aspect of the object comprises a shape or size of the object.

10. The method of claim 1, wherein the dynamic aspect comprises an orientation of the object.

11. The method of claim 1, wherein the dynamic aspect comprises a position of the object relative to a reference.

12. The method of claim 1, wherein the dynamic aspect comprises a color characteristic of the object.

13. The method of claim 1, wherein the dynamic aspect comprises an intensity of the object.

14. The method of claim 1, wherein the altering the dynamic aspect comprises causing a movement of the object.

15. The method of claim 1, wherein the dynamic aspect comprises a behavior of the object.

16. The method of claim 1, wherein the object comprises one of (i) a character representable in Unicode, (ii) a symbol, (iii) a font, (iv) a static image, (v) an animated image, (vi) a video clip, (vii) sound generating data, (viii) an audio clip, (ix) vibration causing data.

17. A computer usable program product comprising a computer readable storage medium, and program instructions stored on the computer readable storage medium, the stored program instructions comprising:
    program instructions to initiate a construction of a dynamic object password (DOP) for user authentication by selecting an object from a set of objects in a step of the construction;
    program instructions to apply a transformation to the object, to form a transformed object, by altering a dynamic aspect of the object;
    program instructions to perform a placement operation on the transformed object relative to a field position of the DOP;
    program instructions to generate, as a part of the step, a triple comprising an identifier of the selected object, an identifier of the transformation, and an identifier of the placement operation; and program instructions to transmit the triple to a server application as a part of transmitting an authorization code, the authorization code forming the DOP.

18. The computer usable program product of claim 17, wherein the computer usable code is stored in the computer readable storage medium in a data processing system, and wherein the computer usable code is transferred over a network from a remote data processing system.

19. The computer usable program product of claim 17, wherein the computer usable code is stored in the computer readable storage medium in a server data processing system, and wherein the computer usable code is downloaded over a network to a remote data processing system for use in a second computer readable storage medium associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to initiate a construction of a dynamic object password (DOP) for user authentication by selecting an object from a set of objects in a step of the construction;

program instructions to apply a transformation to the object, to form a transformed object, by altering a dynamic aspect of the object;

program instructions to perform a placement operation on the transformed object relative to a field position of the DOP;

program instructions to generate, as a part of the step, a triple comprising an identifier of the selected object, an identifier of the transformation, and an identifier of the placement operation; and program instructions to transmit the triple to a server application as a part of transmitting an authorization code, the authorization code forming the DOP.

* * * * *